(12) United States Patent
Nishimoto et al.

(10) Patent No.: US 7,823,601 B2
(45) Date of Patent: Nov. 2, 2010

(54) DRAIN TRAP

(75) Inventors: Shingo Nishimoto, Higashiosaka (JP); Taro Kondoh, Nishinomiya (JP)

(73) Assignee: Kondoh-FRP Co., Ltd., Osaka (JP)

( * ) Notice: Subject to any disclaimer, the term of this patent is extended or adjusted under 35 U.S.C. 154(b) by 574 days.

(21) Appl. No.: 11/662,668

(22) PCT Filed: May 25, 2005

(86) PCT No.: PCT/JP2005/009527

§ 371 (c)(1),
(2), (4) Date: Jan. 15, 2008

(87) PCT Pub. No.: WO2006/040856

PCT Pub. Date: Apr. 20, 2006

(65) Prior Publication Data

US 2008/0099083 A1  May 1, 2008

(30) Foreign Application Priority Data

Oct. 15, 2004 (JP) .............................. 2004-301522

(51) Int. Cl.
*E03C 1/288* (2006.01)
*E03C 1/28* (2006.01)
(52) U.S. Cl. ........................... 137/247.21; 137/533.13; 137/533.15; 137/551
(58) Field of Classification Search ............ 137/247.21, 137/433, 533.13, 533.15, 551, 53.13
See application file for complete search history.

(56) References Cited

U.S. PATENT DOCUMENTS

| 179,881 A | * | 7/1876 | Underwood | 137/247.21 |
| 302,585 A | * | 7/1884 | Pike | 137/247.21 |
| 324,645 A | * | 8/1885 | Bower | 137/247.21 |
| 431,384 A | * | 7/1890 | Mundy | 137/247.21 |
| 1,041,237 A | * | 10/1912 | Budlung | 137/533.13 |
| 1,488,597 A | * | 4/1924 | Gleason | 137/247.21 |
| 1,523,575 A | * | 1/1925 | Beloit | 137/533.13 |
| 1,642,724 A | * | 9/1927 | Fleming | 137/533.13 |
| 1,901,217 A | * | 3/1933 | Yerkes et al. | 137/533.13 |

(Continued)

FOREIGN PATENT DOCUMENTS

JP  52-3057  6/1950

(Continued)

*Primary Examiner*—John Rivell
(74) *Attorney, Agent, or Firm*—The Webb Law Firm

(57) ABSTRACT

To provide a drain trap which can simplify maintenance operations by allowing effluent to flow to a discharge unit properly. The drain trap has a main body equipped with a communicating path which communicates a receiving unit and a discharge unit; a storage unit which, being installed in the communicating path, stores effluent received by the receiving unit; and a normally-closed check valve which, being installed in the communicating path, floats up to allow the effluent in the storage unit to flow to the discharge unit when the effluent reaches or exceeds a set amount, in which the storage unit is installed in such a way as to communicate with a part right under the normally-closed check valve, and the discharge unit is installed in the lowest part of a discharge-side communicating path so that no effluent will be stored in the discharge-side communicating path, which is that part of the communicating path which runs between the normally-closed check valve and the discharge unit.

7 Claims, 5 Drawing Sheets

U.S. PATENT DOCUMENTS

| | | | | |
|---|---|---|---|---|
| 3,724,496 A | * | 4/1973 | Secrist | 137/533.13 |
| 5,201,340 A | * | 4/1993 | Teepe | 137/433 |
| 5,797,426 A | * | 8/1998 | Powell | 137/533.15 |
| 6,422,788 B1 | * | 7/2002 | Hartman | 405/125 |

FOREIGN PATENT DOCUMENTS

| | | |
|---|---|---|
| JP | 51-16493 | 5/1976 |
| JP | 55-51902 | 12/1980 |
| JP | 07-071784 | 3/1995 |
| JP | 7-33051 | 7/1995 |
| JP | 07-45661 | 10/1995 |
| JP | 10-300117 | 11/1998 |

* cited by examiner

DRAIN TRAP

TECHNICAL FIELD

The present invention relates to a drain trap that has a main body equipped with a communicating path which communicates a receiving unit and a discharge unit; a storage unit which, being installed in the communicating path, stores effluent received by the receiving unit; and a normally-closed check valve which, being installed in the communicating path, floats up to allow the effluent in the storage unit to flow when the effluent reaches or exceeds a set amount.

BACKGROUND ART

Drain traps such as described above are installed, for example, in drainage paths which discharge effluent such as drain water of air conditioners to drainage basins. While allowing the effluent received by the receiving unit to flow to the discharge unit through the communicating path, such a drain trap prevents backflow of contaminated air and bad odors by closing the discharge unit using the normally-closed check valve as well as a water sealing action of the effluent stored in the storage unit.

Conventional drain traps include one in which a discharge unit is installed vertically right under a spherical normally-closed check valve in such a way as to penetrate a bottom part of a main body and a storage unit is installed in such a way as to communicate with a part around the normally-closed check valve, excluding a part right under the normally-closed check valve. In this case, the normally-closed check valve is installed in such a way as to close the discharge unit (see, for example, Patent Document 1).

There is another conventional drain trap in which a storage unit is installed in such a way as to communicate with a part right under a spherical normally-closed check valve and a discharge-side storage unit for use to store effluent is provided at a midpoint of a discharge-side communicating path located between the normally-closed check valve and a discharge unit. When effluent in the discharge-side storage unit reaches or exceeds a set amount, the effluent is made to flow to the discharge unit (see, for example, Patent Document 2).

[Patent Document 1]: Japanese Patent Application "kokai" No. 7-71784

[Patent Document 2]: Japanese Utility Model Publication No. 55-51902

DISCLOSURE OF THE INVENTION

Problems to be Solved by the Invention

According to Patent Document 1, effluent is stored around the normally-closed check valve, excluding a part right under the normally-closed check valve. Thus, when the amount of effluent stored in the storage unit reaches or exceeds a set amount, the effluent enters the part right under the normally-closed check valve from around. Consequently, the normally-closed check valve floats up, allowing the effluent to flow to the discharge unit.

When the amount of effluent stored in the storage unit reaches or exceeds the set amount, initially the normally-closed check valve floats up, allowing the effluent to flow to the discharge unit. However, as the flow of the effluent to the discharge unit draws the normally-closed check valve in such a direction as to close the discharge unit, the normally-closed check valve closes the discharge unit, obstructing proper flow of the effluent to the discharge unit.

According to Patent Document 2, effluent is stored in the part right under the normally-closed check valve as well as in a flow path communicated with that part. Thus, when the amount of effluent stored in the storage unit reaches or exceeds the set amount, the normally-closed check valve floats up with rises in the water level of the effluent, allowing the effluent to flow to the discharge unit properly.

However, according to Patent Document 2 above, the discharge-side storage unit is provided in the discharge-side communicating path. Consequently, effluent is stored not only in the storage unit, but also in the discharge-side storage unit, increasing effluent storage capacity.

This makes it necessary to perform maintenance operations such as cleaning frequently to prevent corrosion caused by the effluent. Consequently, the maintenance operations take a lot of trouble.

The present invention has been made in view of the above points. An object of the present invention is to provide a drain trap which can simplify maintenance operations by allowing effluent to flow to a discharge unit properly.

Means for Solving the Problem

To achieve the above object, according to a first feature of the present invention, there is provided a drain trap comprising: a main body equipped with a communicating path which communicates a receiving unit and a discharge unit; a storage unit which, being installed in the communicating path, stores effluent received by the receiving unit; and a normally-closed check valve which, being installed in the communicating path, floats up to allow the effluent in the storage unit to flow to the discharge unit when the effluent reaches or exceeds a set amount, characterized in that the storage unit is installed in such a way as to communicate with a part right under the normally-closed check valve, and the discharge unit is installed in the lowest part of a discharge-side communicating path so that no effluent will be stored in the discharge-side communicating path, which is that part of the communicating path which runs between the normally-closed check valve and the discharge unit.

Since effluent is stored in the storage unit which communicates with a part right under the normally-closed check valve, when the amount of effluent stored in the storage unit reaches or exceeds the set amount, the normally-closed check valve floats up with rises in the water level of the effluent, allowing the effluent to flow to the discharge unit properly.

Also, since the discharge unit is installed in the lowest part of the discharge-side communicating path, the discharge-side communicating path allows the effluent to flow to the discharge unit while preventing the effluent from being stored in a midpoint.

This minimizes the amount of stored effluent. Consequently, there is no need to perform maintenance operations such as cleaning frequently to prevent corrosion caused by the effluent.

This provides a drain trap which can simplify maintenance operations by allowing effluent to flow to a discharge unit properly.

According to a second feature of the present invention, in the drain trap, the main body has a tubular shape with a closed end; the main body is equipped with a lid which covers inner space of the main body, a partition which partitions the inner space of the main body into the storage unit and the communicating path, and a valve seat body of a valve seat unit which catches and supports the normally-closed check valve in such a way as to close the communicating path; and the partition and the valve seat body are configured to be pluggable/unpluggable to/from the main body.

That is, it is possible to construct the drain trap according to the present invention by mounting the partition and valve seat body on the main body and covering the inner space of the main body with the lid. This simplifies construction of the drain trap.

Also, if the lid is removed from the main body and the partition and valve seat body are detached from the main body, the main body, lid, partition, and valve seat body can be disassembled into individual components. This simplifies maintenance operations such as cleaning.

Moreover, the partition and valve seat body are pluggable/unpluggable to/from the main body. This makes it possible to perform a maintenance operation while detaching or attaching the partition and valve seat body easily to/from the main body. This further simplifies maintenance operations.

According to a third feature of the present invention, in the drain trap, the partition and the valve seat body are constructed integrally.

Thus, by simply plugging an integral unit consisting of the partition and valve seat body in the main body, the partition and valve seat body can be plugged in the main body without a need to adjust relative position of the partition and valve seat body.

This simplifies the operation of attaching the partition and valve seat body to the main body as well as maintenance operations.

According to a fourth feature of the present invention, in the drain trap, the partition includes a first partition which has a tubular shape and second partitions which have a plate-like shape, where the first partition is equipped with the valve seat body so as to place the normally-closed check valve in inner space of the first partition and the second partitions are connected to a lateral surface of the first partition and extend outward; and the second partitions have outer tips fittably installed in fit type positioning units which are installed on an inner surface of the main body in such a way as not to oppose each other.

Thus, by fitting the outer tips of the second partitions in the positioning units, it is possible to plug the first partition and second partitions properly in the main body using the positioning units as a guide.

Moreover, the positioning units are installed on the inner surface of the main body in such a way as not to oppose each other. Since the outer tips of the second partitions are fitted in the positioning units, the partition can be oriented properly with respect to the main body.

Thus, not only the outer tips of the second partitions are fitted in the positioning units, but also the partition can be plugged in the main body, being oriented and positioned properly with respect to the main body. This simplifies the operation of attaching the partition to the main body as well as maintenance operations.

According to a fifth feature of the present invention, in the drain trap, the lid has a reflector installed on a lateral surface of the lid.

The drain trap according to the present invention may sometimes be installed in dark places such as a ceiling cavity, making it necessary first to know the installation location of the drain trap in the case of a maintenance operation.

Thus, the reflector is installed on the lateral surface of the lid. Consequently, an operator can recognize the installation location of the drain trap easily by simply shining a flashlight or the like at the lid. This simplifies maintenance operations.

Best Mode for Carrying Out the Invention

A drain trap according to the present invention will be described with reference to the drawings.

The drain trap 1 is installed, for example, in a drainage path 3 which discharges effluent such as drain water of a small air conditioner 2 to a drainage basin or the like as shown in FIG. 1. It is configured to discharge effluent received by a receiving unit 5 through a discharge unit 6 and prevent backflow of contaminated air and bad odors as well as invasion of insects and the like into the small air conditioner 2.

As shown in FIGS. 2 to 4, the drain trap 1 includes a main body 4 equipped with a communicating path 7 which communicates a receiving unit 5 and a discharge unit 6 as well as a storage unit 8 and a spherical normally-closed check valve 9 which are installed in the communicating path 7. The storage unit 8 stores effluent received by the receiving unit 5. The normally-closed check valve 9 floats up to open the communicating path 7 and thereby allow the effluent in the storage unit 8 to flow to the discharge unit 6 when the effluent reaches or exceeds a set amount.

FIG. 2 is an exploded perspective view of the drain trap 1. FIG. 3 is a longitudinal sectional side view of the drain trap 1. FIG. 4 is a cross-sectional plan view of the drain trap 1.

The main body 4 has a tubular shape with a closed end, part of which is raised circumferentially. The receiving unit 5 and discharge unit 6 are disposed on flanks of the main body 4.

The discharge unit 6 is disposed in the middle of that part of the main body 4 where the bottom part is raised circumferentially. The receiving unit 5 is disposed in an opposing relation to the discharge unit 6.

Both receiving unit 5 and discharge unit 6 are constituted of a flow path which extends in a transverse direction, being communicated with inner space of the main body 4.

The receiving unit 5 and discharge unit 6 are disposed at different heights. As shown in FIG. 3, height T1 of the receiving unit 5 is slightly (e.g., 5 mm) larger than height T2 of the discharge unit 6.

The height difference between the receiving unit 5 and discharge unit 6 is designed to make it easier for effluent to flow from the receiving unit 5 to the discharge unit 6.

The drainage path 3 as a whole is tilted down in the downstream direction at a fixed angle to allow the effluent to flow downstream.

Consequently, with increases in the height difference between the receiving unit 5 and discharge unit 6 of the drain trap 1, size of the entire drainage path 3 increases accordingly in the vertical direction.

Thus, the height difference between the receiving unit 5 and discharge unit 6 of the drain trap 1 is reduced to a very small level to reduce the size of the entire drainage path 3 in the vertical direction, as shown in FIG. 3.

The reduction in the vertical size of the entire drainage path 3 is useful especially when installing the drainage path 3 in a ceiling cavity or the like where large installation space is not available.

The communicating path 7 consists of a receiving-side communicating path 10 and discharge-side communicating path 11 as shown in FIG. 3. The receiving-side communicating path 10 is U-shaped, running from the receiving unit 5 to the normally-closed check valve 9. The discharge-side communicating path 11 extends in a straight line in a transverse direction from the normally-closed check valve 9 to the discharge unit 6.

The receiving-side communicating path 10 is installed in such a way as to change the flow direction of the effluent from downward to upward in the bottom part of the main body 4. The storage unit 8 is installed in the part where the change takes place.

In the receiving-side communicating path 10, an annular valve seat unit 15 is installed at a midpoint along the upward flow path. The valve seat unit 15 catches and supports the normally-closed check valve 9 in such a way as to close the communicating path 7.

In this way, the storage unit 8 communicates with a part right under the normally-closed check valve 9.

When the effluent in the storage unit 8 reaches or exceeds a set amount, the normally-closed check valve 9 floats up as indicated by a dotted line in FIG. 3 to open the communicating path 7. This allows the effluent to flow to the discharge unit 6 through the discharge-side communicating path 11.

The upward flow path in the receiving-side communicating path 10 controls the direction in which the normally-closed check valve 9 floats up or descends. After floating up, the normally-closed check valve 9 returns downward in such a way as to close the communicating path 7.

The discharge-side communicating path 11 is installed in such a way that its start point 11*a* will be higher than its end point 11*b*. Furthermore, a slope 11*c* is installed, running downward from the start point 11*a* to the end point 11*b*.

In this way, the discharge unit 6 is installed in the lowest part of the discharge-side communicating path 11 so that no effluent will be stored in the discharge-side communicating path 11.

As shown in FIG. 2, the drain trap 1 has a partition 13 and valve seat body 14 in addition to the main body 4 and a lid 12. The lid 12 covers inner space of the main body 4. The partition 13 partitions the inner space of the main body 4 into the storage unit 8 and communicating path 7. The valve seat body 14 constitutes the valve seat unit 15.

The partition 13 and valve seat body 14 are constructed integrally. The partition 13 and valve seat body 14 are configured to be pluggable/unpluggable to/from the main body.

The partition 13 is composed of a first partition 13*a* which has a tubular shape and second partitions 13*b* which have a plate-like shape. The first partition 13*a* is equipped with the valve seat body 14 so as to place the normally-closed check valve 9 in its inner space. The second partitions 13*b* are connected to an outer periphery of the first partition 13*a* and extend outward.

As shown in FIG. 4, the two second partitions 13*b* are installed on the lateral surface of the first partition 13*a*, being displaced in one direction from diametrically opposed positions. Also, they divide the lateral surface of the first partition 13*a* into two parts.

In one of the two segments obtained by dividing the lateral surface of the first partition 13*a* by the second partitions 13*b*, the first partition 13*a* opens up its inner space through a cut running from the lower end to a set height. In the other segment, the first partition 13*a* opens up its inner space through two openings K formed in vertically intermediate portions thereof.

The annular valve seat body 14 is constructed in the inner space integrally with the first partition 13*a*. The valve seat unit 15 is formed in the inner space to place the normally-closed check valve 9.

The valve seat unit 15 consists of a resin-made annular seat 17 placed on the valve seat body 14. The valve seat body 14 is disposed midway between the upper end of the cut and lower end of the openings K.

An integral unit of the partition 13 and valve seat body 14 is plugged into the main body 4 and the inner space of the main body 4 is sealed by the lid 12. Consequently, the first partition 13*a* and second partitions 13*b* form the storage unit 8 as well as the receiving-side communicating path 10 of the communicating path 7. Furthermore, the openings K of the first partition 13*a* and the raised bottom part of the main body 4 form the discharge-side communicating path 11 of the communicating path 7.

When attaching the integral unit of the partition 13 and valve seat body 14 or the lid 12 to the main body 4, the partition 13 and valve seat body 14 are plugged into the main body 4 and the lid 12 is screwed onto threads 4*a* formed on the main body 4 via a packing 16 of an elastic body. Consequently, the partition 13 is pressed against the main body 4. This seals the inner space of the main body 4 while improving hermeticity of space partitioned by the partition 13.

Also, as shown in FIG. 2, the main body 4, lid 12, and integral unit of the partition 13 and valve seat body 14 can be disassembled into individual components. This makes it easy to perform maintenance operations such as cleaning.

The lateral surface of the lid 12 is covered with a reflector 19 such as reflective tape over the entire circumference. Thus, even if the drain trap 1 is installed in a ceiling cavity, the operator can easily recognize the installation location of the drain trap 1 by simply illuminating the reflector 19.

When installing the drainage path 3 in a ceiling cavity, there is a possibility that various paths other than the drainage path 3 have been installed.

In that case, a specific color such as red can be assigned to the reflector 19 used for the drainage path 3 of the drain trap 1. Another color such as yellow can be used for another path to assign different colors to different paths. The use of different colors for different paths will make it easy to identify each path by the color of the reflector.

The two recessed grooves 18 are installed in an inner surface of the main body 4 to help position the integral unit of the partition 13 and valve seat body 14 properly. The grooves 18 are configured as fit type positioning units.

As shown in FIG. 4, the two grooves 18 are displaced from the midpoint between the installation locations of the receiving unit 5 and discharge unit 6 in the direction of the receiving unit 5, so that they will not be installed opposite to each other.

The second partitions 13*b* have their outer tips fittably installed in the grooves 18. As the tips of the second partitions 13*b* are fitted in the grooves 18, the integral unit of the partition 13 and valve seat body 14 can be plugged in the main body 4, being oriented and positioned properly with respect to the main body 4.

Although detailed illustration is omitted, the grooves 18 are installed not only in the inner surface of the main body 4, but also in the bottom part of the main body 4. Thus, they receive not only the outer tips of the second partitions 13*b*, but also the lower ends of the second partitions 13*b* and lower end of the first partition 13*a* in continuity.

When the integral unit of the partition 13 and valve seat body 14 are plugged in the main body 4, the outer tips and lower ends of the second partitions 13*b* and lower end of the first partition 13*a* are fitted in the grooves 18 with a cushioning material placed on the grooves 18. This improves hermeticity of the space partitioned by the partition 13.

The second partitions 13*b* form part of lateral walls of the storage unit 8. When plugged in the main body 4, they tilt from the side of the receiving unit 5 toward the inner space of the first partition 13*a* where the valve seat body 14 is installed, as shown in FIG. 4. Consequently, the effluent stored in the storage unit 8 flows to right under the normally-closed check valve 9.

Other Embodiments (1) In the above embodiment, the main body 4 has a tubular shape with a closed end, part of which is raised circumferentially. Alternatively, for example, the main body 4 may be configured to have a tubular shape with a simple closed end as shown in FIGS. 5 and 6.

FIG. 5 is an exploded perspective view of a drain trap 1. FIG. 6 is a longitudinal sectional side view of the drain trap 1. A cross-sectional plan view of the drain trap 1 will be omitted because it is the same as the one shown in FIG. 4.

To illustrate, the main body 4 is configured to have a tubular shape with a simple closed end, and as in the case of the above embodiment, the receiving unit 5 is disposed at the vertical midpoint of the main body 4.

The discharge unit 6 is installed in the lowest part of the discharge-side communicating path 11, i.e., at the lower end of the main body 4 in the vertical direction. Furthermore, a bottom face of the main body 4 is sloped to prevent effluent from being stored in the discharge-side communicating path 11.

Although this increases the height difference between the receiving unit 5 and discharge unit 6, it gives the main body 4 a tubular shape with a simple closed end. The configuration can be simplified accordingly.

Also, in the above embodiment, to give the main body 4 a tubular shape with a closed end, a plate-like body may be installed on the partition 13 or main body 4 so that the discharge-side communicating path 11 will slope downward from the openings K of the first partition 13a to the discharge unit 6 when the partition 13 is plugged into the main body 4.

(2) In the above embodiment, the partition 13 and valve seat body 14 are constructed integrally. Alternatively, the partition 13 and valve seat body 14 may be constructed as separate units by configuring the valve seat body 14 to be fittable into the inner space of the first partition 13a.

(3) In the above embodiment, the outer tips of the second partitions 13b are fitted in the two grooves 18 formed in the inner surface of the main body 4 in such a way as not to oppose each other. Alternatively, for example, the outer tips of the second partitions 13b may be fitted in the grooves 18 formed in an opposing relation to each other.

In that case, for example, the two grooves 18 are configured to have a concave shape of different widths. Also, the two second partitions 13b are configured to have different widths corresponding to the grooves 18. Consequently, the integral unit of the partition 13 and valve seat body 14 can be plugged into the main body 4, being oriented and positioned properly with respect to the main body 4.

(4) In the above embodiment, the reflector 19 is disposed on the lateral surface of the lid 12. Alternatively, the installation location of the reflector 19 may be changed, for example, to the lateral surface of the main body 4 as required.

(5) In the above embodiment, the first partition 13a has a tubular shape. Alternatively, the shape of the first partition 13a may be changed, as required, to a column shape which is rectangular in a planar view.

Also, the shape of the main body 4 may be changed as required.

(6) In the above embodiment, the drain trap 1 according to the present invention is installed in the drainage path 3 which discharges drain water of a single small air conditioner 2. Alternatively, the drain trap according to the present invention may be installed in the drainage path of each air conditioner if there are multiple air conditioners whose drainage paths are connected with one another, forming a ramiform drainage path system as a whole.

For example, when an air conditioner is installed in each room of a building such as a hospital building and drainage paths are connected with one another, forming a ramiform drainage path system as a whole, if air pressure differences occur among the rooms due to barometric pressure changes which take place in a treatment room equipped with pressure-regulating facilities, contaminated air or bad odors may flow from high-pressure rooms into low-pressure rooms through the connected drainage paths. Also, contaminated air or bad odors may flow back into the drainage paths due to the influence of outside air such as barometric pressure changes around an outlet of the drainage path system. Furthermore, pathogens may enter the rooms together with the inflow or backflow of the contaminated air and the like.

Thus, preferably, the drain trap according to the present invention is installed in the drainage path of the air conditioner in each room. This can prevent the inflow and backflow of contaminated air and bad odors in the entire drainage path system.

(7) In the above embodiment, the drain trap 1 according to the present invention is installed in the drainage path 3 which discharges drain water of a small air conditioner 2. Alternatively, the drain trap 1 according to the present invention may be installed in various other drainage paths such as drainage paths which discharge effluent from a bathroom or kitchen.

Industrial Utility

The present invention can be applied to drain traps installed in various drainage paths, including a drainage path which passes the effluent from an air conditioner or bathroom.

DESCRIPTION OF THE REFERENCE NUMERALS AND SIGNS

Figure 1:
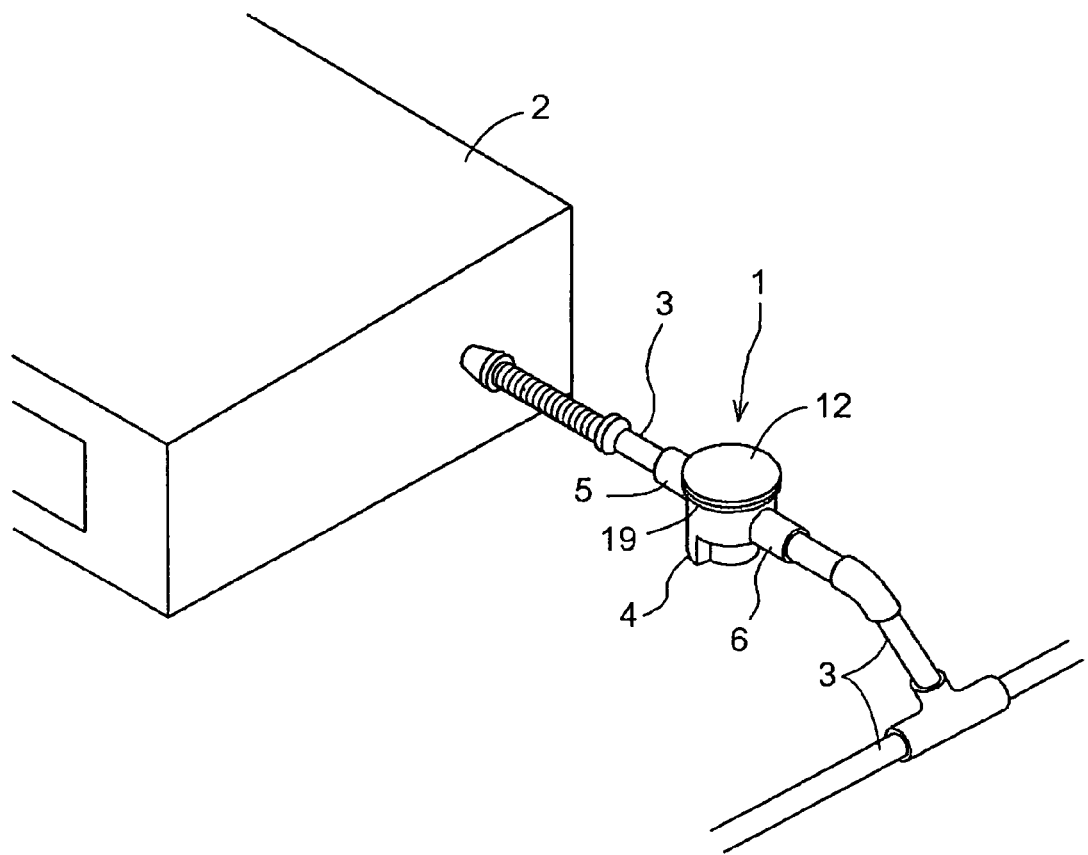
FIG. 1 A diagram showing a drainage path.
Figure 2:
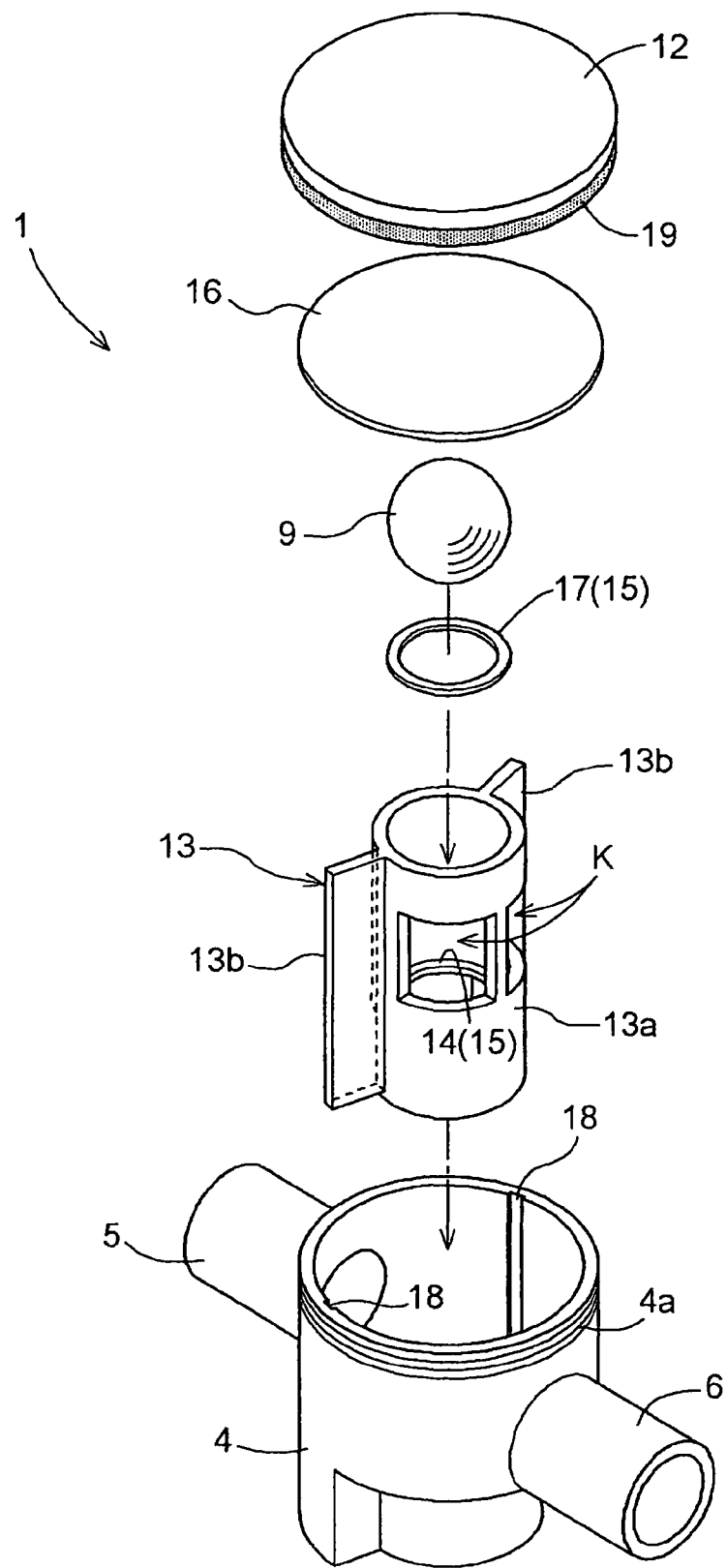
FIG. 2 An exploded perspective view of a drain trap.
Figure 3:
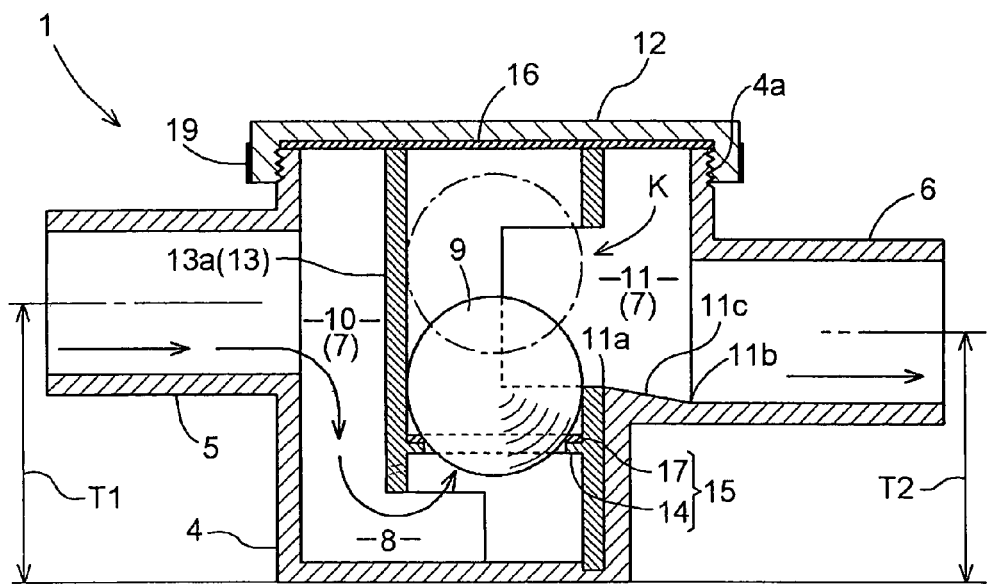
FIG. 3 A longitudinal sectional side view of the drain trap.
Figure 4:
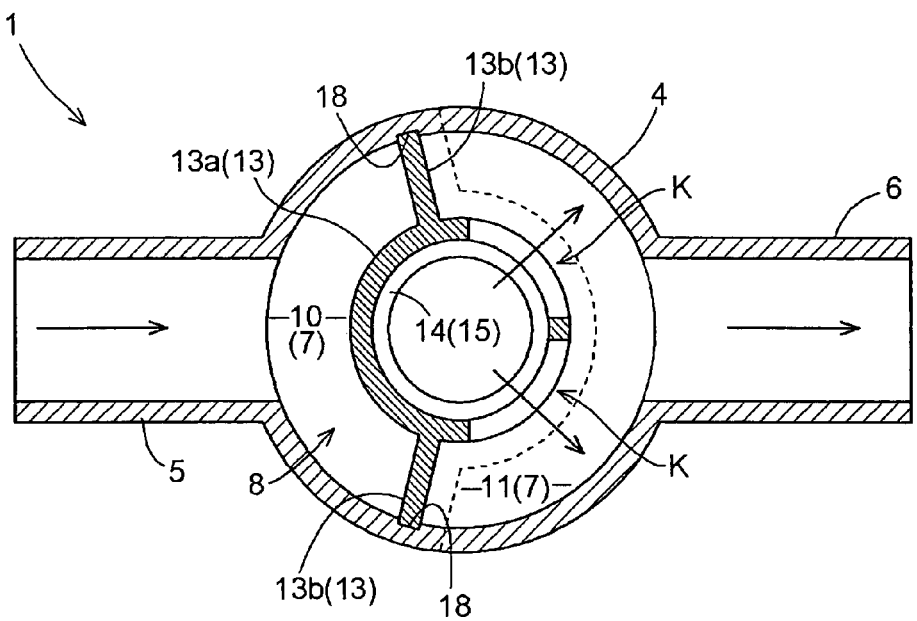
FIG. 4 A cross-sectional plan view of the drain trap.
Figure 5:
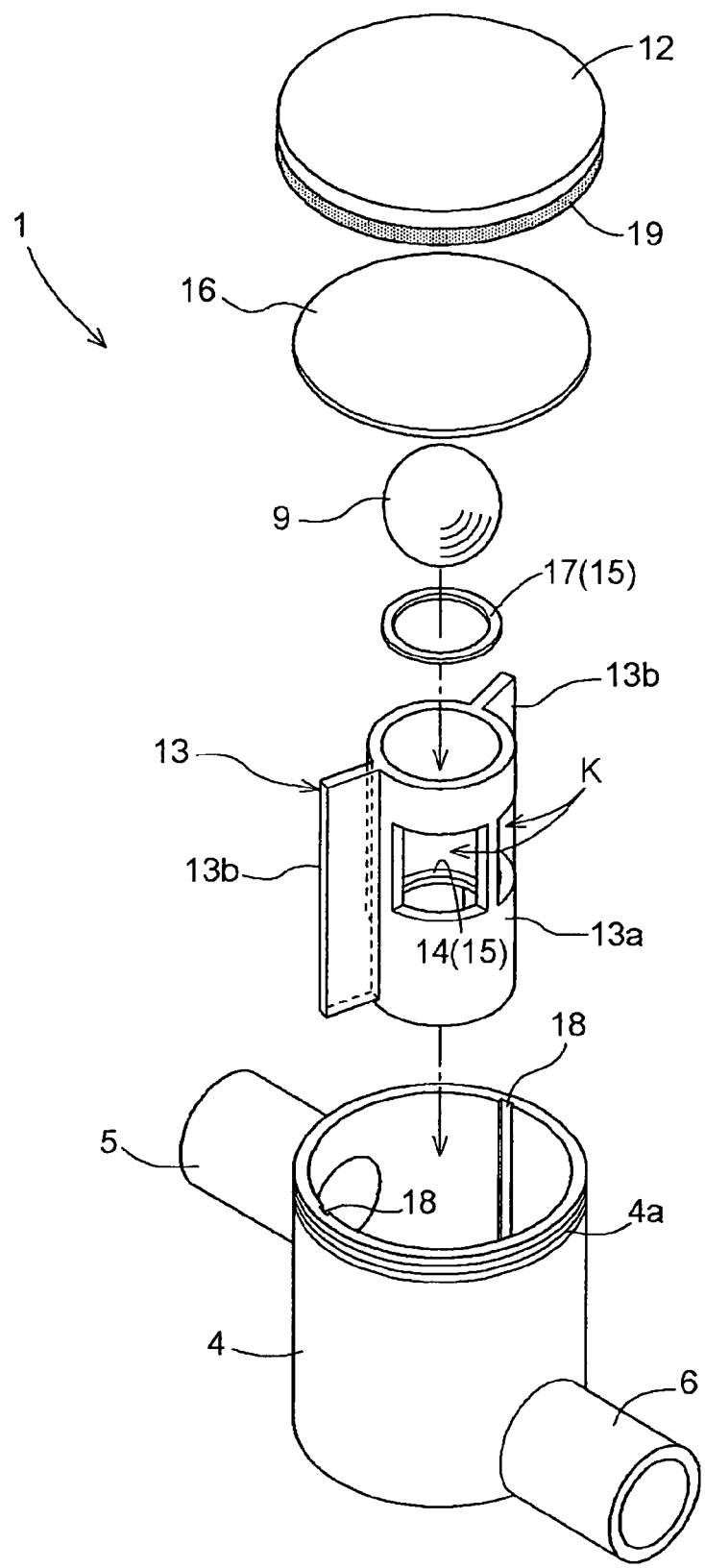
FIG. 5 An exploded perspective view of a drain trap according to another embodiment.
Figure 6:
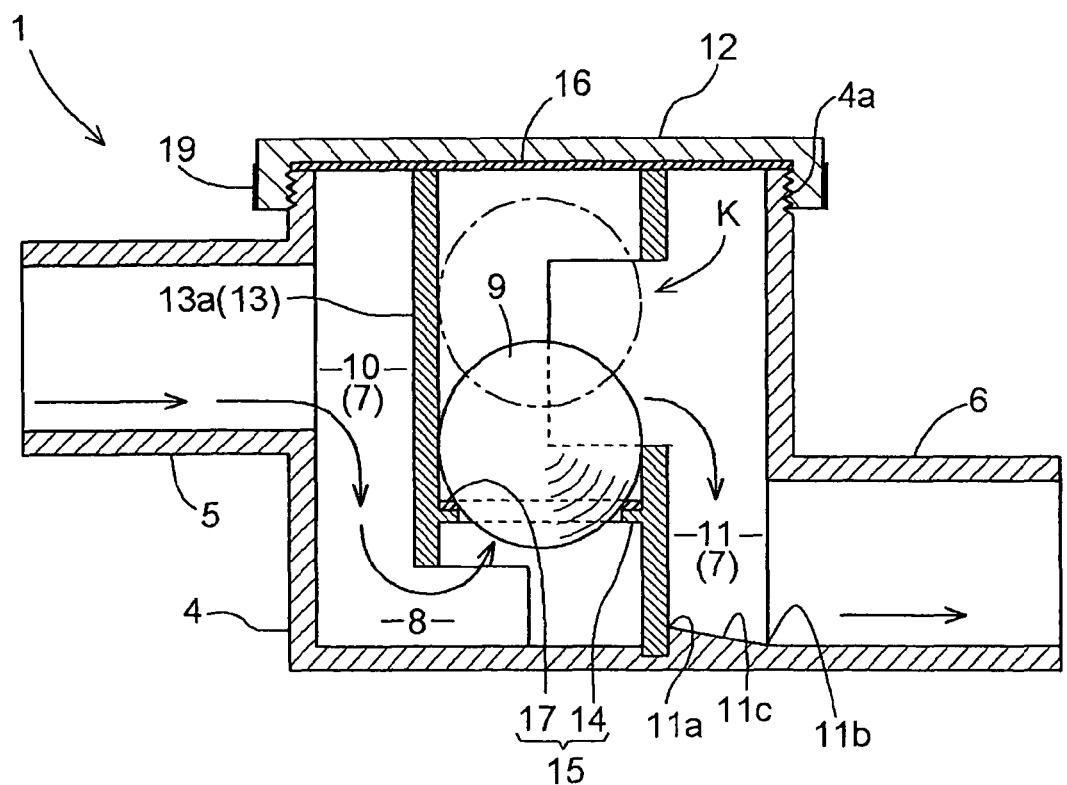
FIG. 6 A longitudinal sectional side view of the drain trap according to the other embodiment.

4 Main body
5 Receiving unit
6 Discharge unit
7 Communicating path
8 Storage unit
9 Normally-closed check valve
11 Discharge-side communicating path
12 Lid
13 Partition
13a First partition
13b Second partition
14 Valve seat body
15 Valve seat unit
18 Positioning unit (grooves)
19 Reflector

The invention claimed is:

1. A drain trap comprising:
a main body equipped with a communicating path which communicates a receiving unit and a discharge unit;
a storage unit which, being installed in the communicating path, stores effluent received by the receiving unit; and a normally-closed check valve which, being installed in the communicating path, floats up to allow the effluent in the storage unit to flow to the discharge unit when the effluent reaches or exceeds a set amount, wherein the storage unit is installed in such a way as to communicate with a part right under the normally-closed check valve, wherein the discharge unit is installed in the lowest part of a discharge-side communicating path so that no effluent will be stored in the discharge-side communicating path, which is that part of the communicating path which runs between the normally-closed check valve and the discharge unit, wherein the main body has a tubular shape with a closed end, wherein the main body is equipped with a lid which covers inner space of the main body, a partition which partitions the inner space of the main body into the storage unit and the communicating path, and a valve seat body of a valve seat unit which catches and supports the normally-closed check valve in such a way as to close the communicating path, wherein the partition and the valve seat body are configured to be pluggable/unpluggable to/from the main body, wherein the partition and the valve seat body are constructed integrally, and wherein the partition includes a first partition which has a tubular shape and second partitions which have a plate shape, where the first partition is equipped with the valve seat body so as to place the normally-closed check valve in inner space of the first partition and the second partitions are connected to a lateral surface of the first partition and extend outward, and wherein the second partitions have outer tips fittably installed in fit type positioning units which are installed on an inner surface of the main body in such a way as not to oppose each other.

2. The drain trap according to claim 1, wherein the lid has a reflector installed on a lateral surface of the lid.

3. A drain trap comprising:
a main body equipped with a communicating path which communicates a receiving unit and a discharge unit;
a storage unit which, being installed in the communicating path, stores effluent received by the receiving unit; and
a normally-closed check valve which, being installed in the communicating path, floats up to allow the effluent in the storage unit to flow to the discharge unit when the effluent reaches or exceeds a set amount, wherein the main body has a tubular shape with a closed end, wherein the main body is equipped with a lid which covers inner space of the main body, a partition which partitions the inner space of the main body into the storage unit and the communicating path, and a valve seat body of a valve seat unit which catches and supports the normally-closed check valve in such a way as to close the communicating path, wherein the partition and the valve seat body are configured to be pluggable/unpluggable to/from the main body, wherein the storage unit is provided in a bottom portion of the main body and formed as a U-shaped channel by a lower portion of the partition so as to store the effluent inside and outside the partition, and wherein the discharge unit is installed in the lowest part of a discharge-side communicating path so that no effluent will be stored in the discharge-side communicating path, which is that part of the communicating path which runs between the normally-closed check valve and the discharge unit.

4. The drain trap according to claim 3, wherein the partition and the valve seat body are constructed integrally.

5. The drain trap according to claim 4, wherein:
the partition includes a first partition which has a tubular shape and second partitions which have a plate shape, where the first partition is equipped with the valve seat body so as to place the normally-closed check valve in inner space of the first partition and the second partitions are connected to a lateral surface of the first partition and extend outward; and
the second partitions have outer tips fittably installed in fit type positioning units which are installed on an inner surface of the main body in such a way as not to oppose each other.

6. The drain trap according to claim 3, wherein the lid has a reflector installed on a lateral surface of the lid.

7. The drain trap according to claim 4, wherein the lid has a reflector installed on a lateral surface of the lid.

* * * * *